(12) United States Patent
Khotimsky et al.

(10) Patent No.: US 6,646,989 B1
(45) Date of Patent: Nov. 11, 2003

(54) HOP-BY-HOP ROUTING WITH NODE-DEPENDENT TOPOLOGY INFORMATION

(75) Inventors: Dennis Andreyevich Khotimsky, Eatontown, NJ (US); Vincent Georges Pierre Fayet, Paris (FR); Antoni Bronislaw Przygienda, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/273,434

(22) Filed: Mar. 20, 1999

Related U.S. Application Data (60) Provisional application No. 60/091,109, filed on Jun. 29, 1998.

(51) Int. Cl.$^7$ .............................................. G08C 15/00
(52) U.S. Cl. .................. 370/238; 370/238.1; 370/254; 370/400; 709/241; 709/238; 709/243
(58) Field of Search .............................. 370/238, 238.1, 370/389, 395.31, 254, 400; 709/241, 238, 243

(56) References Cited

U.S. PATENT DOCUMENTS

| | | | | |
|---|---|---|---|---|
| 4,466,060 A | * | 8/1984 | Riddle ........................ | 709/242 |
| 5,513,182 A | * | 4/1996 | Kawamura et al. ......... | 370/254 |
| 5,596,719 A | * | 1/1997 | Ramakrishnan et al. .... | 709/241 |
| 5,881,243 A | * | 3/1999 | Zaumen et al. ............. | 709/241 |
| 6,108,311 A | * | 8/2000 | Ramaswami et al. ....... | 370/258 |
| 6,141,325 A | * | 10/2000 | Gerstel ....................... | 370/238 |
| 6,301,267 B1 | * | 10/2001 | Ben-Ami ..................... | 370/468 |
| 6,333,918 B1 | * | 12/2001 | Hummel ...................... | 370/238 |

OTHER PUBLICATIONS

Morneau, Keith A., "Routing", Oct. 16, 1998.*
Garcia–Lunes–Aceves, J.J., "Loop–Free Routing Using Diffusing Computations", Feb. 1993, IEEE/ACM Transactions on Networking, vol. 1, No. 1.*

* cited by examiner

*Primary Examiner*—Alpus H. Hsu
*Assistant Examiner*—Michael J Molinari (57) ABSTRACT

This invention relates to a method to effect hop-by-hop routing in a network segment where different nodes have different views of the network topology. In particular, the methods of this invention are applicable when each node in a network or network segment may be aware of only a subset of the communication links in the network, without perceiving other communication links. Based on each node's individual view of the network, the method introduces the concept of a visibility set that includes all visible communication links. More specifically, an efficient algorithm is disclosed for searching for a family of one-to-all optimal feasible paths in communication network where different nodes may have different views of the network topology. The algorithm comprises (a) restricting the set of available paths to a destination node to the set of feasible paths from the source node to the destination node; and choosing as the optimal route the feasible path which has the lowest cost, wherein a path is a feasible path if (i) the path does not contain a cycle, and (ii) for each intermediate node visited by the path, the subpath from that intermediate node to the destination node is visible from the intermediate node.

32 Claims, 8 Drawing Sheets

(c) ⊘ $F_2 = \{e \mid w(e) < 20\}$ (d) ○ $F_3 = \{e \mid w(e) < 10\}$ (b) ● $F_1 = E$

HOP-BY-HOP ROUTING WITH NODE-DEPENDENT TOPOLOGY INFORMATION

This application claims the benefit of U.S. Provisional Application No. 60/091,109 filed Jun. 29, 1998, entitled "*A Method of Hop-By-Hop Routing In Multiprotocol Networks With Overlaid Routing Domains*," which is incorporated herein by reference.

FIELD OF THE INVENTION

This invention relates to communication networks, and more particularly, to hop-by-hop routing in which different network nodes have different views of the network topology.

BACKGROUND OF THE INVENTION

Networks are the principal means of exchanging or transferring information, which may be in the form of data, voice, text, video and the like, among different communication devices connected to the network(s), including I/O devices such as computer terminals, multimedia workstations, fax machines, printers, servers, telephones, videophones, and the like. A network typically comprises switching nodes connected to each other and to communication devices by communication links. Each link is characterized by link capacity, available bandwidth, link propagation delay, processing delay at the associated node, delay variation, and loss probability, among other things. Such characteristics are referred to as "metrics," with some remaining constant, and others varying over time. Information input from the communication devices to the network may be in any form, but is often formatted into packets of either fixed or variable length. When information is to be exchanged between two communication devices, a path is established within the network connecting the nodes (called a source node and destination node) with which those devices are associated.

In many networks, a given communications stream between a specified source and destination is carried over a set of physical paths (i.e., paths comprising the source and destination nodes, and possibly one or more intermediate nodes, and communication links connecting the included nodes) within the network. An important element of network design is the process of selecting a set of physical paths for routing information through the network. This process may take into account various factors, such as network topology, currently available network resources, and quality of service (QoS) commitments made to network users, e.g., guaranteed bandwidth or maximum packet delay, among others. To support path selection, different network nodes maintain information about the network, including node adjacency and link incidence, reachability of different nodes, as well as various other link metrics. This information is stored in a so-called "topology database" of the node and constitutes the node's view of the network.

The routing of information packets from a source node to any other node in the network or a segment of the network, in which all nodes have the same view of the network topology is well established. Two existing routing paradigms in such networks are source routing and hop-by-hop routing. In source routing, the entire route taken by a packet from source to destination may be pre-computed and placed on the packet. As the packet is passed from the first node to a second node, the second node strips its address from the pre-specified route and passes the packet to the next node indicated in the packet header. In the alternative routing technique of hop-by-hop routing, no pre-computed route is employed. Each packet contains only the destination address. Upon receiving a packet, each intermediate node refers to its routing table, computed on the basis of its topology database, to forward the packet along the next hop towards the destination node.

Well-known methods, such as Dijkstra's shortest path algorithm, have been developed, which given the single static view of the network, determine under fairly general conditions the shortest routing path between any two network nodes. However, if different network nodes have different views of the network topology, such algorithms cannot guarantee loop-free and effective routing.

Recently, the focus in network routing has shifted, however, toward dynamic or state-adaptive routing. Beside reducing configuration work, such routing adapts quickly to changes in the available resources of the network and link failures. Several design solutions exist for dynamic routing in computer networks and are still under development, with distance vector and link-state protocol approaches being the ones well-known.

The basic idea of link state routing protocols is that each node sends local network topology information to its neighbors. This information is then propagated through the network using sophisticated "flooding" mechanisms. As the result, every node accumulates the view of the entire network in its topology database. The generation and flooding of information is repeated each time a node sees a significant change in available local resources. The distributed pieces of topology information, link state up-dates (LSU) or link state elements (LSE), carry a unique identifier and a version number increasing when the information inside of such an LSU is changing. Additionally, to prevent this process from being triggered too often, a dampening function controls the thresholds holding back non-significant changes. The topology database resulting from the execution of this latter "flooding" mechanism between nodes is used to compute routes to the desired destinations. Such routes are used, for example, in hop-by-hop forwarding of packets. The distance vector approach is based on a significantly different idea. Each node continuously diffuses information about the distances to different network sites reachable via that node. At the same time, it uses data received from other nodes and metrics of its own links to recompute the set of best routes, thus updating the distance information it distributes.

Despite the simplicity of the latter protocols, they are plagued by problems, such as long convergence times, forming of loops and lack of scalability in terms of topology sizes supported. Research is being performed to alleviate some of the problems. It should be noted that these link-state protocols also suffer from excessive amount of information being flooded in larger topologies. Therefore, newer link-state routing protocols incorporate a concept of "hierarchy," where a part of the network running a link-state protocol collapses into a logical node in the view of distant nodes, and between such logical nodes, sometimes called areas, where some form of distance vector protocol is being executed.

Modern routing protocols, such as PNNI, are following the trend toward extensibility for future requirements, which abandon fixed packet formats and use TLV (type, length, value)—encoded packet schemes. The "type" describes the fixed part of the TLV transmitted and the "length" indicates the offset in the packet where the next TLV starts. In cases where the length exceeds the length of the fixed part of the TLV, embedded TLVs are present. Generally, TLV encoded packets transferring topology information in modern routing protocols can be interpreted as representations of lists of arbitrary elements embedded themselves in a recursive fashion into lists at a higher level.

An additional property of many of the prior art routing protocols is their ability to flood information elements even if they are opaque to the receiver since their type is not known. This allows newer protocol versions to be introduced as well as experimental features in an existing network to be deployed without the necessity of bringing all the nodes synchronously to the same release. To operate properly, guaranteeing packet delivery to the destination without creating loops, the link-state and distance vector protocols require that the topology databases of different network nodes converge to the same view of the network. In the networks deployed so far, however, different versions of link-state protocols cannot interoperate when new metrics or novel link properties are introduced, unless a translation between them is performed. Furthermore, network topologies are traditionally partitioned into disjoint domains corresponding to different routing protocols due to the possibility of loop creation.

SUMMARY OF THE INVENTION

The present invention presents a method to effect hop-by-hop routing in a network segment where different nodes have different views of the network topology. In particular, the methods of this invention are applicable when each node in a network or network segment may be aware of only a subset of the communication links in the network, without perceiving other communication links. Based on each node's individual view of the network, the method introduces the concept of a visibility set that includes all visible communication links. A network segment may contain an ordered hierarchy of such visibility sets and each visibility set may contain a subset of all communication links in the network segment.

In general, an efficient algorithm is disclosed for searching for a family of one-to-all optimal feasible paths in a communication network where different nodes may have different views of the network topology. Generally, the invention comprises the following steps:

(a) restricting the set of available paths to a destination node to the set of feasible paths from the source node to the destination node; and (b) choosing as the optimal route the feasible path which has the lowest cost, wherein a path is a feasible path if (i) the path does not contain a cycle, and (ii) for each intermediate node visited by the path, the subpath from that intermediate node to the destination node is visible from the intermediate node.

The invention ensures that forwarding a packet along an optimal feasible path guarantees its eventual delivery to the destination node without being dropped or being routed to the same node twice. The present method provides for the execution of multiple dynamic routing protocols, possibly overlaying each other in the same address space, within a network with common kinds of metrics of arbitrary complexity. It also solves the problem of interoperability when new metrics or novel link properties are being introduced and eliminates the necessity to run different protocols and protocol versions within disjoint routing domains.

BRIEF DESCRIPTION OF THE DRAWINGS

The features and advantages of the present invention will become more readily apparent from the following detailed description of the invention in which.

DETAILED DESCRIPTION OF THE INVENTION

The following detailed description of the inventive method is divided into the following sections. Section I, after introducing the basic definitions and describing the network communication model, formalizes the problem of routing in overlaid domains by considering the perceived cost of paths and nodes' visibility sets. Section I then defines the notion of a feasible path and proceeds by defining the routing policy rules which are necessary and sufficient for successful routing under general visibility conditions, as well as formulating the criterion of path feasibility in the particularly important case of embedded visibility sets. Section II specifies the algorithm searching for optimal feasible paths and proves its correctness. Several applications of immediate practical importance are considered in Section III, followed by the discussion of longer term perspectives in Section IV.

I DEFINITIONS AND INTRODUCTION TO THE MODEL

A. Model Description

Let a computer communication network be modeled by a directed graph G=(V, E), where the vertices in set V represent the switching/routing nodes and the edges in E correspond to unidirectional communication links. Each edge e of the graph is assigned a unique weight w(e) from a cost class W representing some link configuration or state parameter, relevant to routing. In such a setting, the "length" of a link is most often not its true geometrical length, but can be a value representing any characteristic of that link. "Weight" will be used as the general term for such values, with the cost given by the sum of the weights, as set forth more fully herein below.

Although in many cases it is sufficient to think of the weight as a non-negative integer, we allow it to have a more complex structure. A cost class W could be any set which contains the elements, zero 0 and infinity ∞; is closed under a properly defined summation operation; and can be totally ordered with some "not worse than" relation. We refer to such set as an "abstract cost class." To avoid confusion, the summation operation on the elements of W, which is referred to as formal addition, is denoted ⊕, whereas the notation ≦ is used for the ordering relation. As an example of a non-integer cost class, consider a system in which the available bandwidth is the primary routing criterion, while the number of hops is used as a tiebreaker. The corresponding cost class is a set of pairs (B, H), where B is real and H is an integer. The zero and infinity elements are represented by $(\infty,0)$ and $(0,\infty)$, respectively, and the definitions of formal addition and comparison are:

$$(b_1,h_1) \oplus (b_2,h_2) = (\min\{b_1,b_2\}, h_1+h_2),$$

$$(b_1,h_1) \leq (b_2,h_2) \Leftrightarrow (b_1 > b_2) \text{ or } (b_1 = b_2 \text{ and } h_1 \leq h_2)$$

To ensure generality, we assume that relation established by E is reflexive, i.e., every node has a link to itself. Assume further that for any link $e=(u,v) \in E$, its weight w (e) is non-zero, if and only if vertices u and v are distinct.

B. Basic Definitions and Notation

A directed path $\pi$ on graph $G=(V, E)$ can be equivalently defined by a sequence of incident edges or by a sequence of adjacent vertices. A path is simple if it does not contain a cycle. A path containing no edges is called "degenerate" and is denoted $\phi$.

Let $\pi=(v_1,v_2,\ldots,v_n)$. Any path $\pi_{ij}=(v_i,v_{i-1},\ldots,v_j)$, such that $1 \leq i \leq j \leq n$, is a "subpath" of $\pi$. In this case, $\pi$ is an "extension" of $\pi_{ij}$. If $\pi'=(v_n,u_1,u_2,\ldots,u_m)$, then $\rho=(v_1,v_2,\ldots,v_n,u_1,u_2,\ldots u_m)$ is a "concatenation" of $\pi$ and $\pi'$.

Every subset of edges $F \subseteq E$ defines a "partial graph" $G_F=(V,F)$. Let F' be a reflexive closure of F. We will refer to the set of all directed paths in $G'_F=(V,F')$ as a "topology" $\mathcal{J}$ induced by F. Edge subset F is a "base set" of topology $\mathcal{J}$. A non-degenerate path belongs to topology $\mathcal{J}$, if and only if all its edges are elements of the base set F. For any two vertices s and d in V, vertex d is "accessible" in F from s, if topology $\mathcal{J}$ induced by F contains a path $\pi=\pi(s,d)$ from s to d.

C. Cost of a Path and Visibility Sets

We are interested in modeling the situation when different nodes see the network differently. In particular, "a view" of some vertex $v \in V$ can be completely specified by the set of "perceived weights" $\{w_v(e) | e \in E\}$ of all the edges. While perceived weights of the same edge may vary from vertex to vertex, the invariant value of w(e) will be referred to as the "proper weight" of an edge.

Definition 1 (Absolute cost) The absolute cost $C(\pi)$ of a non-degenerate path $\pi$, such that $\pi=(u_1,u_2,\ldots,u_n)$, is a formal sum of the proper weights of all its edges:

$$C(\pi) = \bigoplus_{1 \leq i \leq n} w(u_i, u_{i+1}) \quad (1)$$

The absolute cost of a degenerate path is zero: $C(\phi)=0$.

If in Eq. (1), the proper weights w are substituted by the perceived weights $w_v$, we obtain the definition of the "perceived cost" $C_v(\pi)$ of the path. It follows immediately from these definitions that the cost of a concatenation of two paths is equal to a formal sum of the costs of these paths, and the cost of any subpath is not worse than the cost of the path itself. We restrict our attention to the case when each vertex either sees an edge with its proper weight or doesn't see it at all.

Definition 2 (Visibility set) For every $v \in V$, there exists a subset $F_v \subseteq E$, such that:

$$w_v(e) = \begin{cases} w(e), & \text{if } e \in F_v \\ \infty, & \text{otherwise} \end{cases} \quad (2)$$

The subset $F_v \subseteq E$ is called the visibility set of v.

Without any loss of generality, we assume that all outgoing edges of vertex v belong to $F_v$. We say that a path $\pi$ "is visible from" v, if $\pi$ belongs to the topology induced by the visibility set of v. The following fact, which characterizes our approach to visibility, follows immediately from the definitions of perceived cost and visibility set.

Theorem 1 The perceived cost of any given path is the same for all nodes for which the entire path is visible.

In the following presentation, $C(\pi)$ denotes the absolute cost of path $\pi$ invariant in the view of all nodes for which entire $\pi$ is visible.

Definition 3 (Path optimality) Let $\mathcal{J}$ (s,d) be a set of paths from s to d. Path $\pi^*$ is an optimal path in $\mathcal{J}$ (s,d), if it is not worse than any other path in $\mathcal{J}$ (s,d):

$$\forall \pi \in \mathcal{J} \text{ (s,d): } C(\pi^*) \leq C(\pi) \quad (3)$$

Clearly, the optimal path in any given set $\mathcal{J}$ may not be unique.

Depending on the choice of set $\mathcal{J}$, different types of optimal paths can be obtained. If $\mathcal{J}$ (s,d) is a subset of the topology induced by the edge set E, restricted to the paths from a given source s to a given destination d, then path $\pi^*(s,d)$ in Definition (3) is "absolutely optimal." If $\mathcal{J}$ is a similarly restricted subset of $\mathcal{J}_v$, a topology induced by the v's visibility set, then $\pi^*$ is an "optimal visible path."

D. Guaranteed Routing in the Network with General Visibility Sets

In a traditional setting, when the visibility sets of all nodes in the network (or part of the network) executing some link-state routing protocol are assumed to be identical, the routing process amounts to finding the optimal (shortest) path to the desired destinations in the entire network or subnetwork. Well-known methods, such as Dijkstra's shortest path algorithm, have been developed which allow to solve this problem efficiently under fairly general conditions. However, if the visibility set invariance assumption is relaxed, these algorithms can no longer guarantee loop-free and effective routing.

When a node makes a routing decision, it naturally considers only the paths that are visible from it. The best path among those, i.e., the optimal visible path, may differ from the absolutely optimal path if the latter is not visible from the node. Furthermore, forwarding a packet to the next node along the optimal visible path can guarantee neither that the packet will actually follow this path, nor even that the packet will eventually reach its destination.

Figure 1:
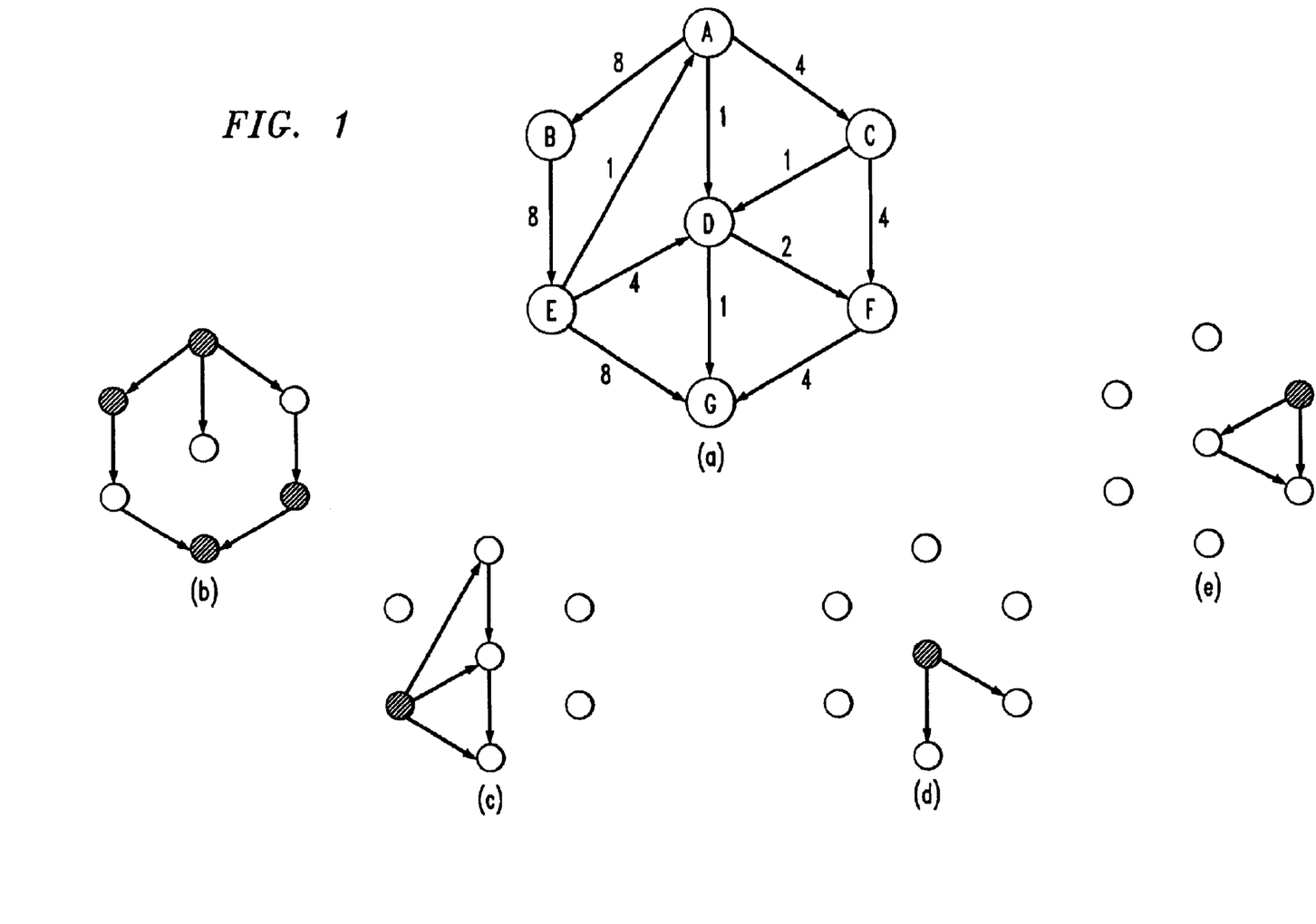
FIG. 1 illustrates routing with incomplete information; (a) shows a hypothetical sample graph, and (b)–(e) show visibility sets shared by the corresponding shaded vertices.

The obvious reason is that, in general, the visibility set of any node receiving the packet "along the path" is different from that of the source. Therefore, this node may see a worse (or better) path to the destination or may not see a path at all. Consequently, it may deflect the packet from the path selected by the source or simply drop it. As an example, consider the routing of a packet from source node A to destination node G in a computer communication network represented by the graph of FIG. 1(a), with the visibility sets shared by the corresponding shaded vertices depicted in (b)–(e). The absolutely optimal path from A to G is (ADG)

having cost 2. But since link (DG) does not belong to the A's visibility set, the path itself is not visible from A and, therefore, is not available for routing. Among the two visible paths, (ABEG) and (ACFG), path (ACFG) is clearly optimal having cost 12, as opposed to cost 24 of path (ABEG). However, if the packet is forwarded along the optimal visible path, then C, who does not see any path to the destination at all, may simply discard the packet. Assume that A forwards the packet along the non-optimal visible path (ABEG). Node E, which receives the packet after two forwarding operations, does not know anything about its previous history, and searches for the path to the destination within its own visibility set. Again, if E selects the optimal visible path (EADG), then the packet is routed back to the source thus creating a loop. On the other hand, the selection of a non-optimal path (EDG) succeeds; node D receives the packet and forwards it to the destination via link (DG) which belongs to visibility sets of both E and D.

Our objective is to establish a routing policy, i.e., a set of rules each node has to comply in order to perform routing successfully in the network where distinct nodes may have different visibility sets.

In accordance with the principles of the invention, the first rule of the routing policy (RP1) is postulated:

(RP1) If the destination is not accessible in the visibility set of a given node, this node may drop the packet.

The decision to route a packet is "successful," if the packet is eventually delivered to the destination without being dropped or routed to the same node twice. The routing decision made by some node is "guaranteed," if this node is able to prove the decision to be successful, based on its limited information about the network, under the assumption that all the nodes follow the same routing policy rules. Rule (RP1) implies that for a routing decision to be guaranteed, it is necessary to ensure that the destination is accessible, in the respective visibility set, from any other node that may receive the packet.

Definition 4 (Feasible path) A path from source to destination is feasible at the source, if:

(a) the path is simple, and (b) for every node visited by the path, the subpath from that node to the destination is visible from that node.

Corollary 1 Any subpath of a feasible path is itself a feasible path.

Corollary 2 If path $\pi=\pi(u,d)$ is feasible at u, and there exist a node s with an outgoing edge $e=(s,u)$, such that $\pi$ is visible from s, then an extension path $\pi'=(s,u,d)$ is feasible at s.

Referring again to the sample graph of FIG. 1, observe that path (ABEG) is the only feasible path at source A, and paths (EDG) and (EG) are both feasible at E, among those (EDG) being optimal.

As the main result of this section, we formulate the second rule of the routing policy (RP2) and prove the following theorem about it.

(RP2) If there exists a feasible path from a given node to the destination, this node should forward the packet along a path which is optimal among all such feasible paths; otherwise the node should drop the packet.

Theorem 2 In a general network of nodes adherent to (RP1), for any routing decision to be guaranteed, it is necessary and sufficient that every node also complies with (RP2).

Proof. Necessity. We begin with showing that, if rule (RP2) is violated by some node, then it is not possible to prove the success of a routing decision. Let there exist a node, referred hereto as the source, that does not comply with (RP2). Without any loss of generality, assume that the destination is accessible in the source's visibility set. (If it was not the case, no routing decision could be possibly guaranteed, as the source could expect any node, to which the packet is forwarded, to drop it.)

If the source forwards the packet along a non-feasible path $\pi$, whether or not a feasible path exists, then, by the definition of feasibility, there exists a node u visited by $\pi$, such that the subpath $\pi_u$, from u to the destination is not visible from u. Therefore, the destination is not necessarily accessible from node u in its visibility set and this node could drop the packet according to (RP1).

Figure 2:
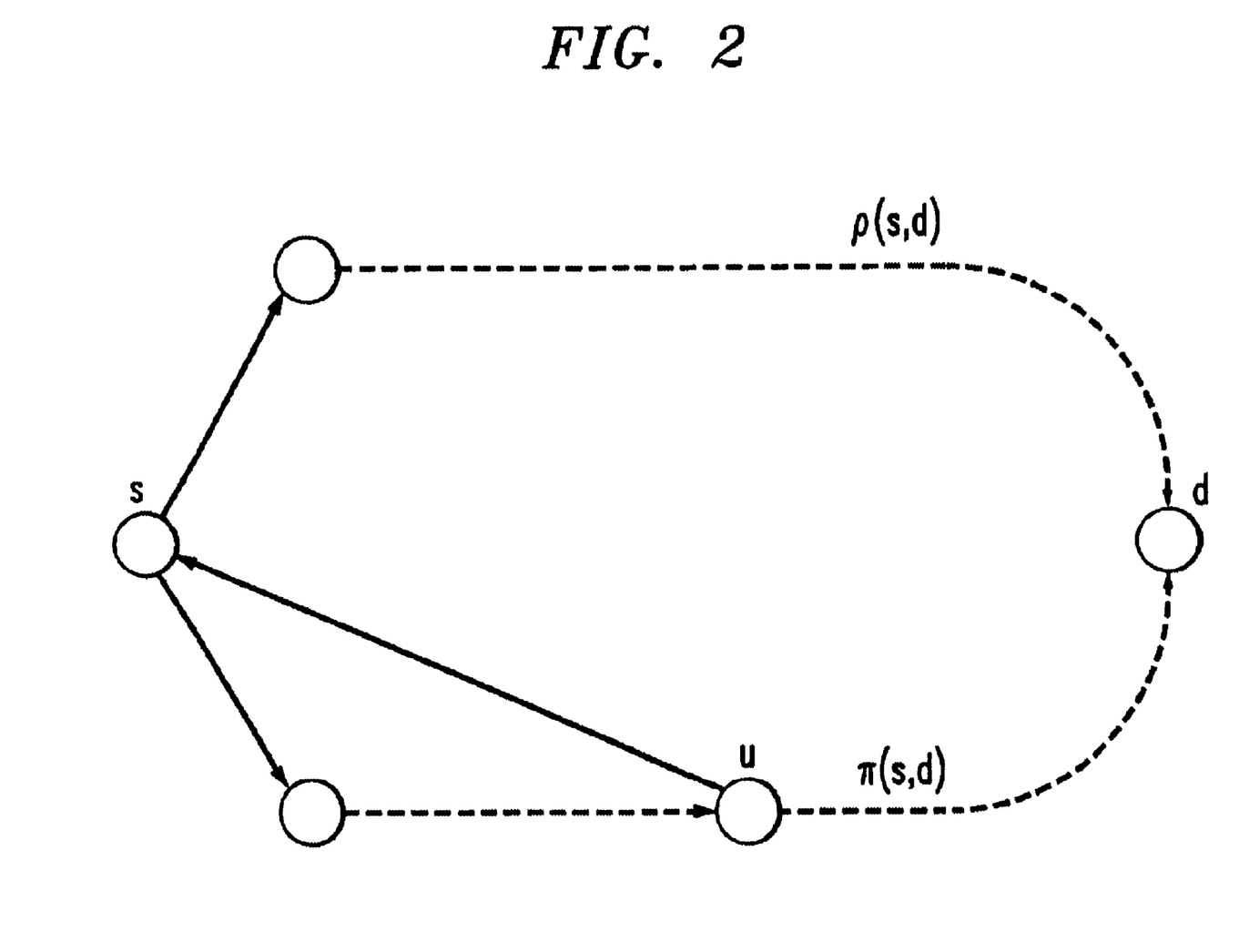
FIG. 2 illustrates how routing along a non-optimal feasible path may create a cycle.

Now consider the case where two feasible paths to the destination, $\pi(s,d)$ and $\rho(s,d)$, are visible from s. Let these paths differ in the first edge and let $C(\rho) \leq C(\pi)$, $C(\rho) \neq C(\pi)$. Assume the source forwards the packet along the non-optimal path $\pi(s,d)$ as depicted in FIG. 2. There could exist a node u visited by path $\pi$ with an outgoing edge $e=(u,s)$, such that path $\rho(s,d)$ is visible from u and $w(e) \oplus C(\rho) \leq C(\pi_u(u,d))$. Then by Corollary (2), the extended path $\rho'=(u,s,d)$ is feasible at u, and $C(\rho') \leq C(\pi_u(u,d))$, so that node u, compliant with (RP2), would forward the packet back to s thus creating a loop.

Sufficiency. Let "source" be any node whose routing decision is assigned the first sequence number and prove the following statement by induction on the number of forwarding operations:

Lemma A node receiving the packet after n forwarding operations sees at least one feasible path to the destination and chooses such feasible path, that its cost is not worse than the cost of the original path chosen by the source.

Let $\pi_n^*$ be the path chosen by the node $u_n$, which receives the packet after n forwarding operations. For n=0, node $u_0$ is in fact source s itself, and the statement trivially holds. Assume $\pi_k^*$ is feasible at $u_k$ and $C(\pi_k^*) \leq C(\pi_0^*)$. The packet is forwarded by $u_k$ to node $u_{k-1}$, which by definition of feasibility, sees the subpath of $\pi_k^*$ from itself to destination. This subpath is feasible at $u_{k+1}$, by Corollary (1). Since $\pi_{k+1}$ which is chosen by $u_{k+1}$ according to (RP2), is an optimal feasible path, it is not worse than the subpath of $\pi_k^*$ and, therefore, not worse than $\pi_k^*$ itself. Then by transitivity, $C(\pi_{k+1}^*) \leq C(\pi_0^*)$, which completes the proof of the inductive step.

According to the Lemma, node $u_n$, which receives the packet after n forwarding operations, sees at least one feasible path to destination. Since, by the premise of the Theorem, $u_n$ is compliant to (RP2), it does not drop the packet, but forwards it along one of the available feasible paths. As the packet forwarding sequence can be restarted at any node, it is enough to show that the actual path taken by the packet does not contain a cycle at the source. To the contrary, assume that after n forwarding decisions, the packet is routed back to the source: $u_n = u_0 = s$. Accounting for the cost of the cycle, we obtain:

$$C(\pi_0^*) = C(\pi_n^*) = C(\pi_0^*) \oplus \left( \bigoplus_{0 \leq i < n-1} w(u_i, u_{i+1}) \right)$$

which necessarily implies that, for all i, $w(u_i, u_{i+1}) = 0$. This is a contradiction with the definition of edge weights. Therefore, if all nodes comply with (RP2) as well as (RP1), no loop could be possibly created. It follows that under these rules, no edge is crossed more than once and, since the number of edges in the graph is finite, the packet eventually reaches destination.

Observe that the cost of the "actual route" taken by the packet, which is forwarded in compliance with the routing policy rules (RP1) and (RP2), lies between the costs of an absolutely optimal path and an optimal feasible path found at the source.

E. Embedded Visibility Sets

We now specialize for the case of "embedded" visibility sets. Let vertex set V be partitioned into K disjoint subsets $V_1, V_2, \ldots, V_K$. Each of the subsets $V_i$ is associated with a visibility set $F_i \subseteq E$ such that all nodes in $V_i$ share the same view of the graph. Furthermore, let the visibility sets be hierarchically related:

$$E = F_1 \supset F_2 \supset \ldots F_{K-1} \supset F_K \quad (4)$$

Figure 3:
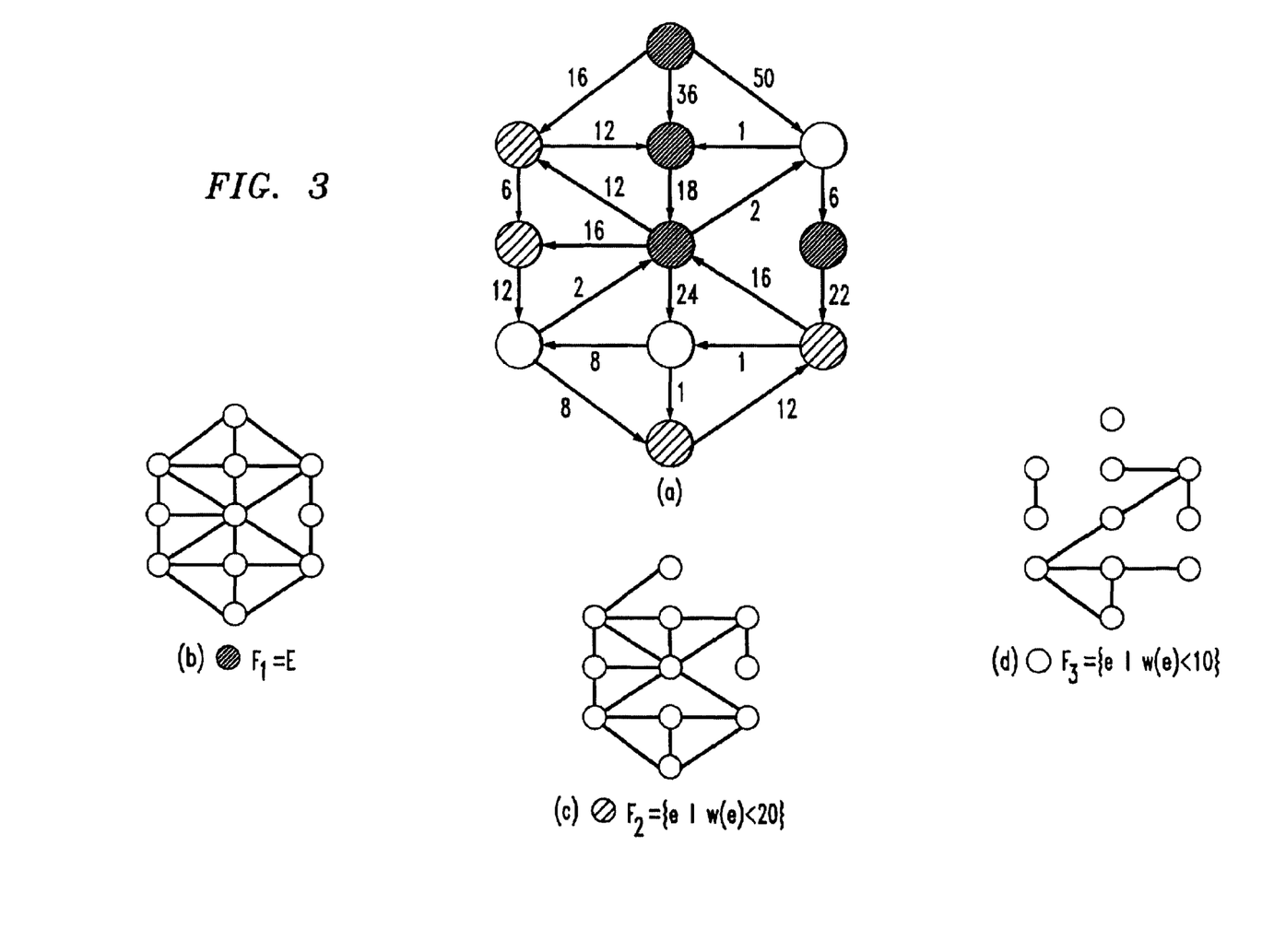
FIG. 3 illustrates embedded visibility sets; (a) shows a sample graph with three classes of vertices distinguished by the density of shading, and (b)–(d) shows the visibility sets for each class and formal definitions.

As an example, consider the graph of FIG. 3. The visibility sets of each of the three node classes are determined by the value of the edge weights: if some weight exceeds a class-specific threshold, the corresponding edge is not visible from the nodes of the class.

For convenience of presentation, let $\Gamma(e)$ and $\Delta(e)$ denote the initial vertex and the terminal vertex of a directed edge e, respectively, and define the following operators:

Class (.) applies to a node and returns the index r of the subset $V_r$ to which the given node belongs;

View(.) applies to a node and returns the visibility set of the node: $View(u) = F_{Class(u)}$;

Vis (.) applies to an edge and returns the "visibility index" of the edge, i.e., the largest index of a visibility set in hierarchy Eq. (4) which includes the given edge:

$$(Vis(e) = r) \Leftrightarrow (e \in F_r \text{ and } (e \notin F_{r-1} \text{ or } r = K))$$

For each vertex subset $V_i$, $1 \leq i \leq K$ and the visibility set $F_i$, we define a corresponding topology $\mathcal{T}_i$. The base set $T_i$ of topology $\mathcal{T}_i$ consists of all such edges in $F_i$, whose initial vertex has a visibility set which includes $F_i$:

$$T_i = \{e \in F_i | F_i \subset View(\Gamma(e))\} \quad (5)$$

Figure 4:
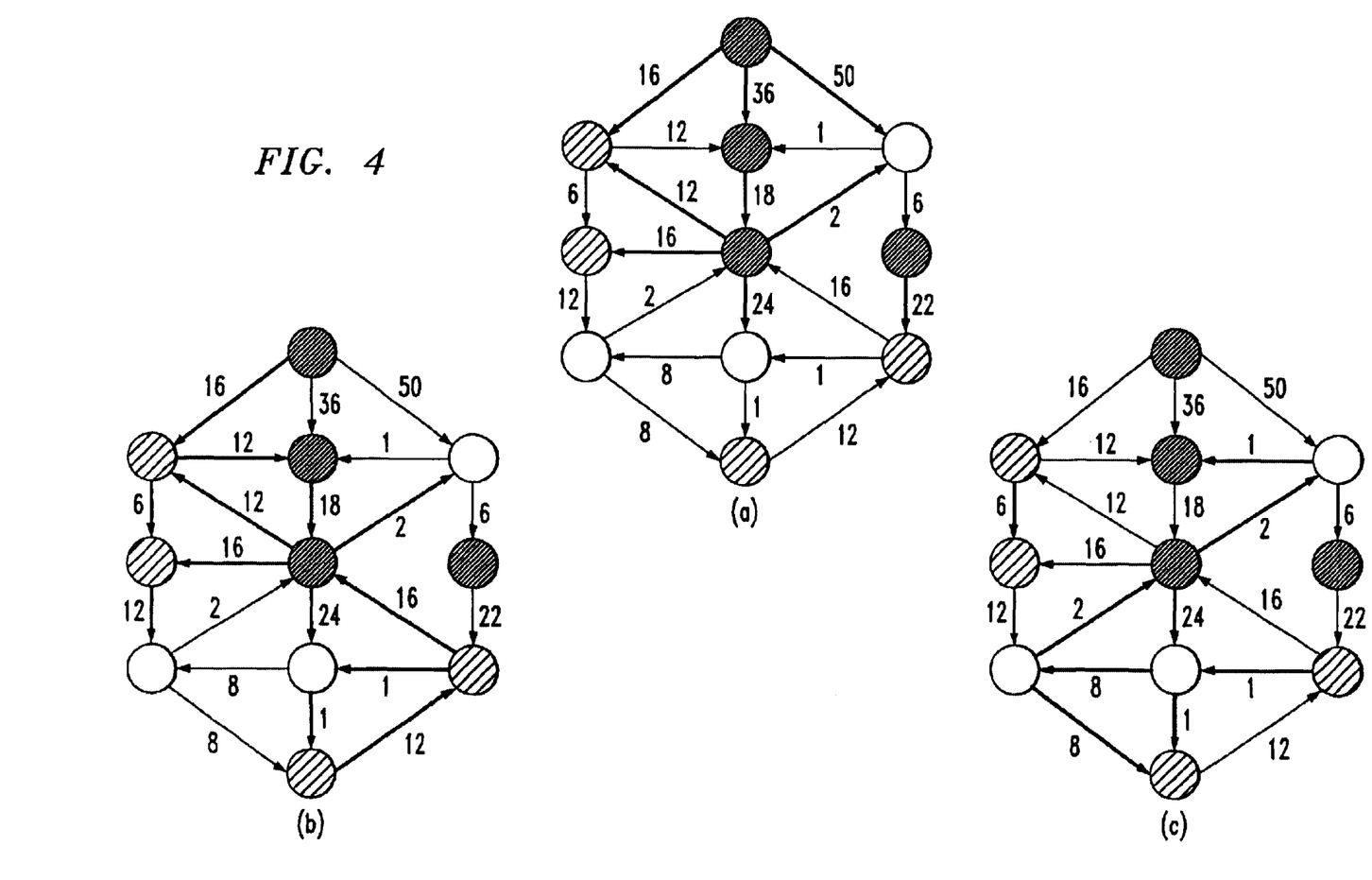
FIGS. 4(a)–(c) illustrate the topologies induced by the three visibility sets (a) $\mathcal{J}_1$; (b) $\mathcal{J}_2$ and (c) $\mathcal{J}_3$, respectively.

Observe that for i=K, the base set of the topology coincides with the corresponding visibility set: $T_K = F_K$. For the sample graph presented above, the topologies induced by the visibility sets are shown in FIGS. 4: (a) $\mathcal{T}_1$; (b) $\mathcal{T}_2$; (c) $\mathcal{T}_3$; and (d) $\mathcal{T}_4$.

The following Theorem establishes the necessary and sufficient condition for a path to be feasible in the case of embedded visibility sets.

Theorem 3 (1) If source vertex u belongs to vertex subset $V_r \subset V$, which has visibility set $F_r$ satisfying hierarchy Eq. 4, and $v \in V$ is some destination vertex, then all feasible paths from u to v can be represented as a concatenation:

$$\pi(u,v) = (t_z^* t_{z+1}^* \ldots t_K^*) \quad (6)$$

where $t_i^*$ is a (possibly degenerate) subpath in topology $\mathcal{T}_i$ with the base set $T_i$ constructed according to eq. (5), and z is the smallest visibility index among all edges in $\pi(u,v)$:

$$r \leq z = \min_{e \in \pi(u,v)} Vis(e)$$

(2) All simple paths of the form Eq. (6) are feasible at u.

Proof. (1) Use induction on the number n of edges in the path. First, let n=1. Consider a path containing single edge e=(u,v). This path is feasible by the premise of the Theorem. Therefore, $e \in View(u)$ which implies that $View(u) \supseteq F_{Vis(e)}$, as the opposite statement, $e \in View(u) \subset F_{Vis(e)}$, contradicts the definition of the visibility index. It follows that $e \in T_{Vis(e)}$, and the basis of induction is established.

Let the statement hold for a path $\pi_n = (u_1, v_1, v_2, \ldots v_n)$ containing n edges:

$$\pi_n = (t_z^* t_{z+1}^* \ldots t_K^*)$$

where $z \geq r$ is the smallest visibility index achieved by some edge e in $\pi_n$, and consider a feasible extension $\pi_{n+1} = (s, u, v_1, v_2, \ldots v_n)$. By feasibility of $\pi_{n+1}$, $e \in View(s)$ and $View(s) \supseteq F_{Vis(e)} = F_z$. Two cases are possible.

Case (a): $Vis(s,u) \geq Z$. Then $(s,u) \in F_z$ belongs to the base set $T_z$, so the subpath $t_z^*$ can be extended to include link (s,u). The representation of eq. (6) holds for $\pi_{n+1}$ with z unchanged.

Case (b): $Vis(s,u) < z$. Then by feasibility of $\pi_{n+1}$, $(s,u) \in View(s)$ and $View(s) \supseteq F_{Vis(s,u)}$. Therefore, $(s,u) \in T_{Vis(s,u)}$. Concatenate representation for $\pi_n$ to subpath $t_{Vis(s,u)}^* = (s,u)$, complemented by (z−Vis(s,u)−1) degenerate subpaths. The result $$\pi_{n+1} = (t_{Vis(s,u)}^* \phi_{Vis(s,u)+1} \ldots \phi_{z-1} t_z^* t_{z+1}^* \ldots t_K^*)$$

is of the form Eq. (6) with Vis(s,u) being the smallest visibility index among the edges of $\pi_{n+1}$. The proof of the inductive step is completed.

(2) Let $\pi(u, v)$ be a simple path which can be represented in the form of (6). Choose arbitrary edge e in $\pi$ and find index of its subpath in this representation; let it be i. By construction of topology $\mathcal{T}_i$, $$View(\Gamma(e)) \supseteq F_i$$

Consider subpath $\rho = \rho(\Gamma(e), v)$ of $\pi(u,v)$ from the initial node of e to destination v. By assumption, every edge d in $\rho$ belongs to the base set $T_j$ of some topology $\mathcal{T}_j$, where $i \leq j \leq K$. By construction, Eq. (5), it necessarily belongs to the corresponding visibility set $F_j$. Combining hierarchy eq.(4) with the results above, for any edge d of $\rho$, we obtain:

$$d \in F_j \subseteq F_i \subseteq View(\Gamma(e))$$

Thus, for any vertex $\Gamma(e)$ visited by path $\pi(u,v)$, the subpath $\rho = \rho(\Gamma(e), v)$ is visible from $\Gamma(e)$. Path $\pi(u,v)$ is feasible at u.

It follows from the Theorem 3 that in order to guarantee successful delivery in a general case, a node should drop the packet if no feasible path to destination exists. Note that, however, an attempt can be made to improve the probabilistic chances of the packet to be delivered to requested destination in the absence of feasible path while preserving the static no-loop guarantee. The sufficient condition of the packet discard could be relaxed as follows:

(RP2)' A node should forward the packet along the path which is optimal among the feasible paths from that node to the destination, if such path exists. The node should drop the packet if and only if there exist no feasible path to the destination, and for all its outgoing edges, the terminal vertex of the edge belongs to the same or lower class of hierarchy (4) than the node itself. When no feasible path exists, but there is an outgoing edge, such that its terminal vertex belongs to the higher class of hierarchy, the node should forward the packet along such edge.

Figure 5:
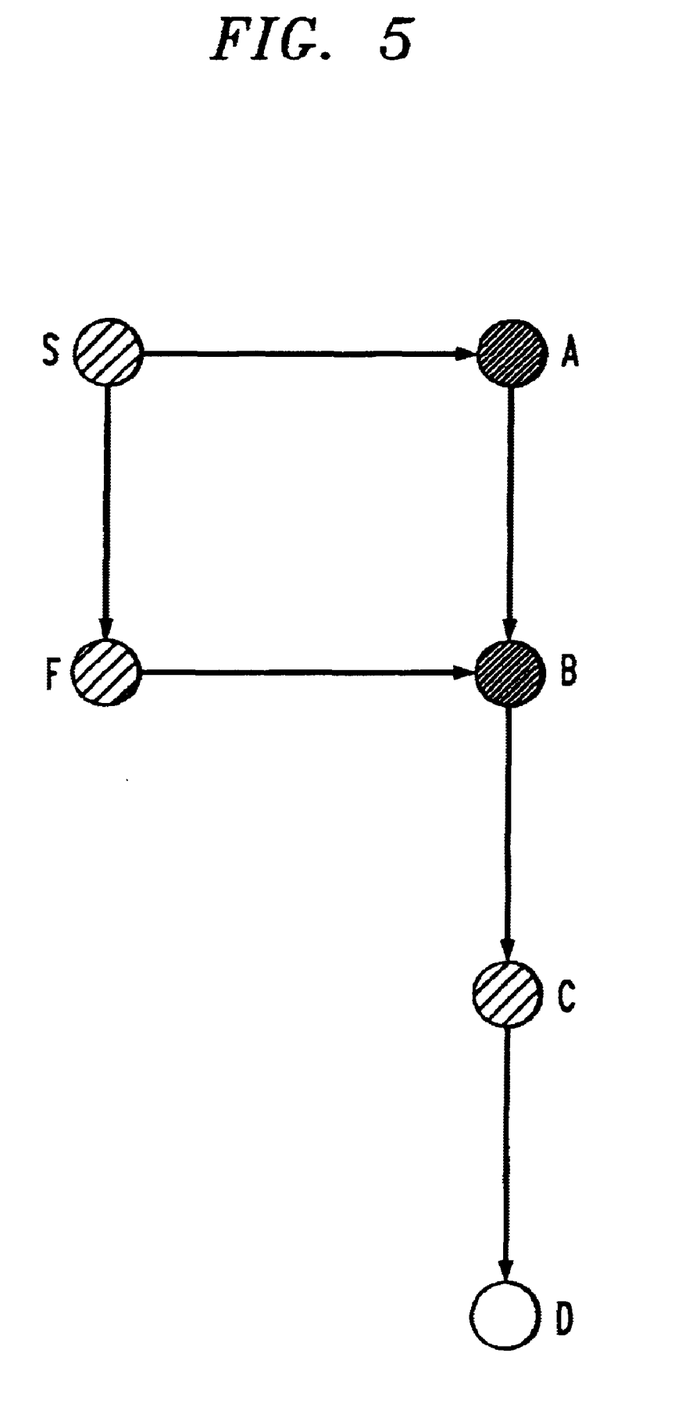
FIG. 5 illustrates a graph for demonstrating the probabilistic advantage of forwarding a packet to a knowledgeable neighbor when no feasible path exists.

In a network of well-behaved nodes compliant with (RP2)', the packet may not be forwarded back to the source neither as it passes up in the hierarchy, nor as it follows the feasible path discovered by some other node in the network; the latter case would imply existence of a feasible path from the source to destination. The loop-free property follows. The probabilistic advantage of rule (RP2)' can be demonstrated using the graph on FIG. 5. Node S does not see a feasible path to destination, because link (BC) is outside its visibility set, whereas its more knowledgeable neighbor A does see a feasible path and may forward the packet successfully.

However, in a well-behaved static network, a node should not have received a packet destined to an unreachable node, at the first place, and therefore not included with the proposed algorithm below, but not excluded from the principles of the invention.

II ALGORITHM

A. Specification

Figure 6:
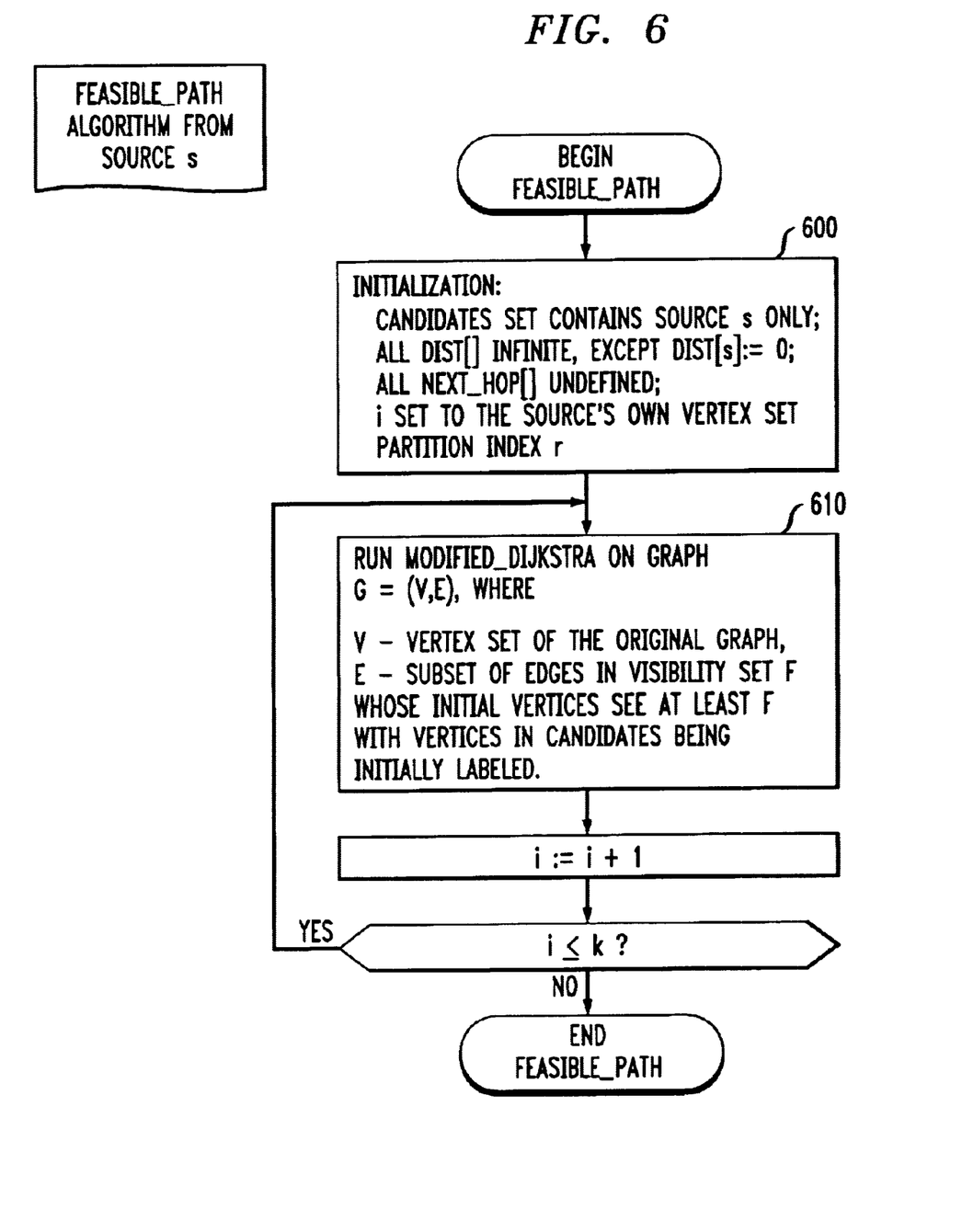
FIG. 6 is a flowchart of the feasible path algorithm employed in the present invention.

Referring to FIG. 6, discussed herein below is an algorithm applied to the case of embedded visibility sets of Eq. (4). It can be used to detect the existence of a feasible path from source $s \in V_r$ to any destination $d \in V$ and, if such path exists, to compute the next hop of an optimal feasible path in accordance with principles of the invention.

The information about the network available to each node includes the membership of this node in the specific disjoint subset of nodes, the weights of the edges in its own visibility set along with the edge membership in the visibility sets of the lower hierarchical levels. Given this incomplete information, at step 600, the source node first initializes the distance vector to infinity and then iteratively runs a variation of a shortest path algorithm or modified Dijkstra algorithm at step 610 on the gradually expanding partial graph. A flowchart for the modified Dijkstra algorithm of the present invention is set forth in FIG. 7.

Figure 7:
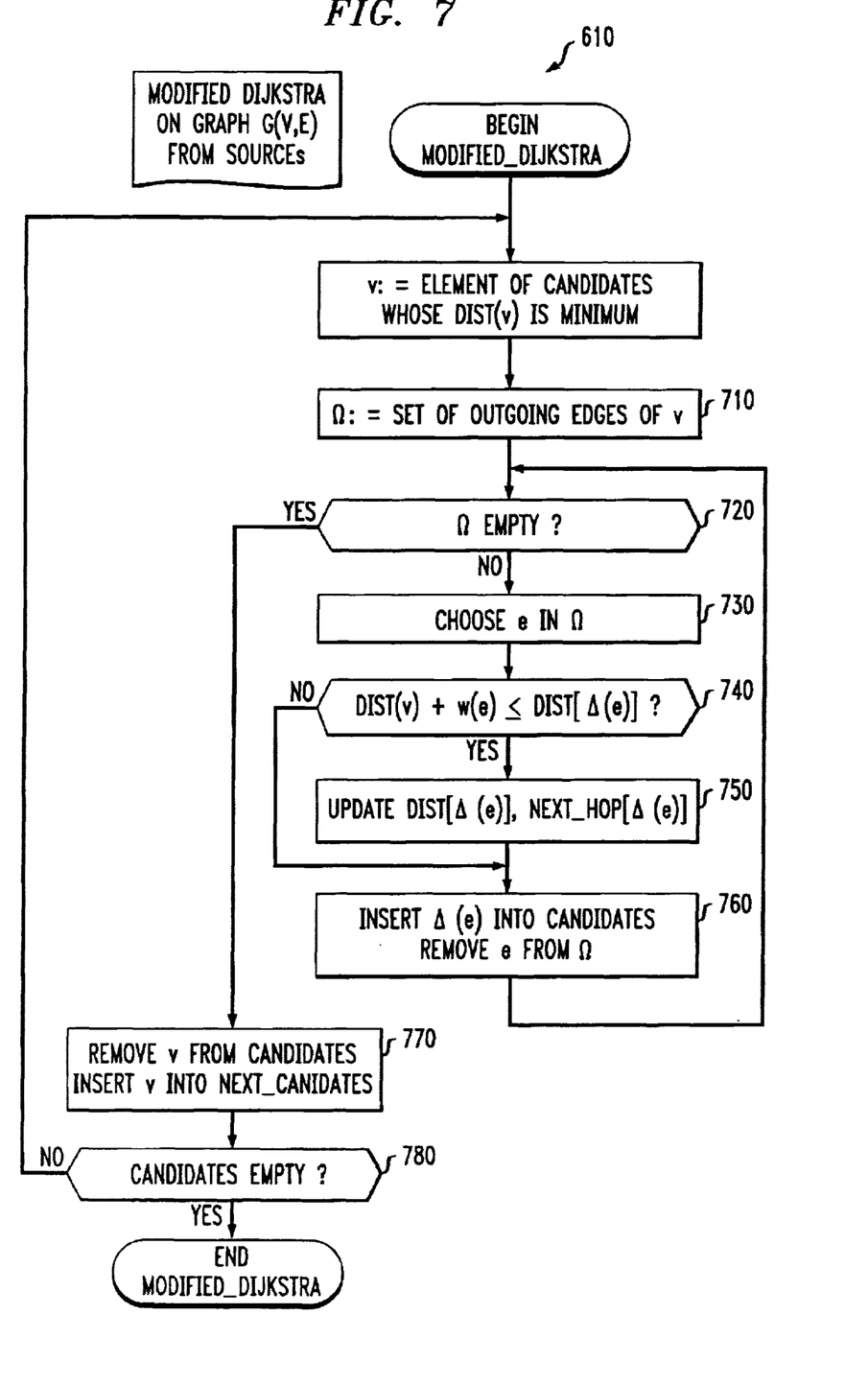
FIG. 7 is a flowchart of a so-called "modified Dijkstra algorithm" of FIG. 6.

In the specification of the proposed algorithm, we make use of the following notation:

r is the index of the vertex set partition to which the source (i.e., node running the algorithm) belongs;

k is the total number of partitions of the vertex set;

$\{V_i, i=1 \ldots k\}$ is a collection of vertex set partitions;

$\{F_i, i=r \ldots k\}$ is a collection of visibility sets of partitions on the same or lower hierarchical levels than that of the source;

$\{w(e), e \in F_r\}$ is the set of perceived weights of edges in the visibility set of the source;

dist[1:N] is a vector of tentative distances to all nodes in the network, i.e., the costs of the best feasible paths from the source to the respective vertex $v \in V$ found so far;

next_hop[1:N] is a vector of initial edges of the feasible paths leading to respective nodes in the network;

candidates and next_candidates are the ordered sets of vertices; sorting is performed in increasing order of the tentative cost of the feasible paths from the source to the respective vertex, in respect to relation $\leq$. Three operations on the ordered sets are available in the shortest path algorithm for the modified Dijkstra algorithm of FIG. 7:

1. insert(set, v): insert node v into a proper position in set, in the increasing order of the dist vector;
2. update(set,v): change position of node v in set using the modified value of dist[v], so that the increasing order of dist is maintained;
3. remove(set): remove and return the first element of set.

Each node in the network maintains two vectors: vector dist [1:N] of distances to all other nodes in the network computed along the corresponding optimal feasible path, and vector next_hop[1:N] of initial links of those paths.

When a packet destined to v is received at some node, it checks if the locally maintained value of dist[v] is finite. If it is the case, this node forwards the packet along the link specified by next_hop[v]. Otherwise, it drops the packet reporting the destination as unreachable. Alternatively, the implementation may attempt to improve the probabilistic chances of the packet to be delivered to the requested destination, while preserving the no-loop guarantee, by forwarding it to an adjacent node belonging to a higher class of hierarchy and having larger visibility set. However, in a well-behaved network when a routing protocol has converged to a stable state, a node should not have received a packet destined to an unreachable destination in the first place. Therefore, we do not consider this possibility further. To maintain dist [1:N] and next_hop [1:N] current, each node recomputes them either periodically or each time a significant change in link state parameters is detected.

Initially, in step 600 of FIG. 6 the source s sets to infinity all entries of the distance vector except its own, which is set to zero. Next, a set of communication links visible from the source node is chosen in step 710. For any edge (i.e., communication link) in this visibility set (step 730), the entry corresponding to the source node in the distance vector is computed or updated, if necessary, as shown in steps 740 and 760. Next, the node entry in the next hop vector corresponding to the source node is computed, as shown in step 750. These steps are repeated until all the edges in the visibility set being considered are exhausted. Next, a new visibility set is considered in step 710 and the entries in the distance and next hop vectors are again updated for all nodes in this visibility set. This is repeated until all visibility sets are considered, as in steps 770, 780. This completes execution of the modified Dijkstra shortest path algorithm for the network.

Listed hereto as an appendix is the pseudo-code for the procedure feasible_path ( ) of FIG. 6, which is used to update the local data structures for the proposed routing method of the present invention.

B. Example

Figure 8:
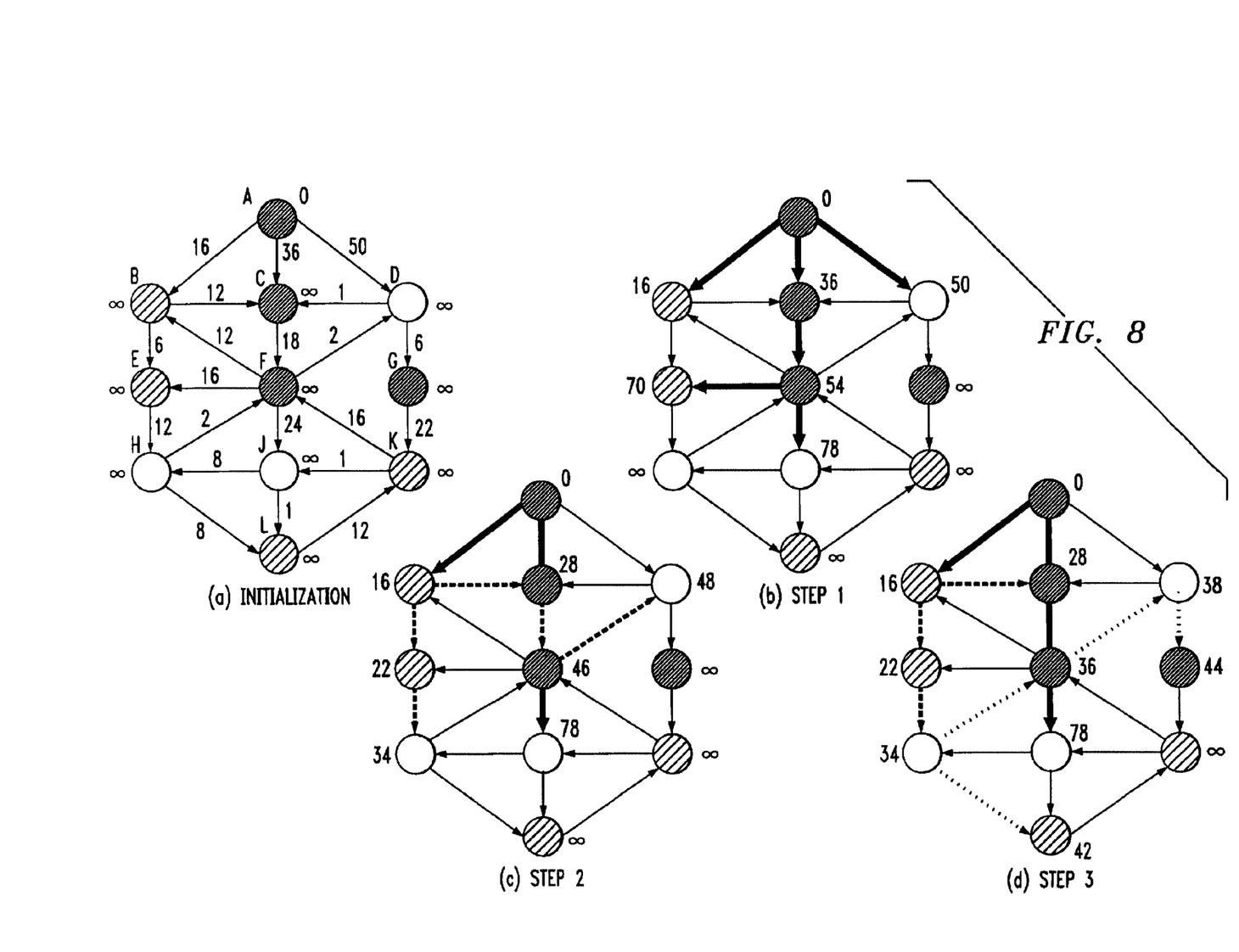
FIG. 8 shows the operation of the feasible path algorithm on the sample graph of FIG. 4, with capital letters denoting the identification of the vertex, italicized numbers denoting edge weights, and bold numbers denoting tentative distances from the source A.

The operation of the algorithm on our sample graph of FIG. 3 is illustrated on FIG. 8. At the initialization stage (FIG. 8(*a*)), the source A sets to infinity all entries of the distance vector (except its own, which is initialized to zero), and keeps the entries of the next-hop vector undefined. At Step 1 (FIG. 8(*b*)), the shortest path algorithm is executed on the topology $\mathcal{T}_i$ associated with the visibility set of the source. As a result, the vertices accessible from the source in this topology, namely, B,C,D,E,F, and J, acquire finite distances, and the initial links of their corresponding feasible paths are now defined. Notice that after Step 1, the set of feasible paths forms a tree. It should be emphasized, that this set is shown on FIG. 8(*b*) for reference purposes only; the actual data maintained by the source can be found in Table I.

At Step 2 (FIG. 8(*c*)), the candidates set initially contains those and only those vertices that have finite tentative distances at the end of Step 1. Removal of vertices from the candidates set occurs in the increasing order of their tentative distances and only those edges are considered by the shortest path algorithm which belong to the base set $T_2$ of topology $\mathcal{T}_2$ (see FIG. 8(*b*)). The first to be removed is vertex A which has no outgoing edges in $T_2$. It is followed by vertex B, whose tentative distance is 16, which adds links (BC) and (BE), causing a change in the distance vector: dist[C]=28 and dist[E]=22, and redirecting next_hop[C]

from link (AC) towards link (AB). Next, vertex is E is removed adding link (EH) which completes a feasible path to vertex H, so that dist [H] becomes 34, etc. Notice that from Step 2 on, the set of feasible paths no longer forms a tree: the tentatively optimal feasible path from source A to vertex F is (ABCF), whereas for vertex J it is (ACFJ).

At the beginning of Step 3, the candidates set is re-initialized again to contain vertices A, B, C, D, E, F, H, J, and the operation is repeated, but this time only edges in the base set $T_3$ of topology $\mathcal{T}_3$ are considered. The distances of vertices F and D are reduced, due to discovery of feasible paths (ABEHF) and (ABEHFD), while vertices G and L are reached for the first time. Vertex K remains unreachable, since it does not have incoming edges in $\mathcal{T}_3$. At this point the algorithm terminates, yielding the costs and identities of initial links of optimal feasible paths to all vertices, except K (FIG. 8(d)). Overall, the maximum number of times each edge is considered equals to the number of topologies this edge belongs to.

TABLE I

EVOLUTION OF LOCAL DATA STRUCTURES IN THE COURSE OF EXECUTION OF PROCEDURE feasible_path() AT SOURCE VERTEX A. ENTRY FORMAT: dist[v]/next_hop[v]; '*': undefined; '-': LOCAL.

| Vrtx | Init. | Step 1 | Step 2 | Step 3 |
| --- | --- | --- | --- | --- |
| A | 0/- | 0/- | 0/- | 0/- |
| B | ∞/* | 16/(AB) | 16/(AB) | 16/(AB) |
| C | ∞/* | 36/(AC) | 28/(AB) | 28/(AB) |
| D | ∞/* | 50/(AD) | 48/(AB) | 38/(AB) |
| E | ∞/* | 70/(AC) | 22/(AB) | 22/(AB) |
| F | ∞/* | 54/(AC) | 46/(AB) | 36/(AB) |
| G | ∞/* | ∞/* | ∞/* | 44/(AB) |
| H | ∞/* | ∞/* | 34/(AB) | 34/(AB) |
| J | ∞/* | 78/(AC) | 78/(AC) | 78/(AC) |
| K | ∞/* | ∞/* | ∞/* | ∞/* |
| L | ∞/* | ∞/* | ∞/* | 42/(AB) |

C. Correctness

Based upon the teachings of the present invention, those skilled in the art will readily note that the proposed procedure is based on a variation of the well-known Dijkstra's shortest path algorithm applied repeatedly to a partial graph which is expanded according to the established rules set forth above. The correctness properties of Dijkstra's algorithm in the broader context of the different shortest path problems are analyzed in the prior art, as well as the proof of its finiteness and the discussion of its implementation strategies.

In its original form, Dijkstra's algorithm operates on a graph with non-negative integer edge weights and constructs a shortest path tree by scanning the vertices in the increasing order of their tentative distances from the start vertex. This is performed by labeling the outgoing edges of each scanned vertex, i.e., updating the distances and the tree pointers, if an edge under consideration creates a shorter path to its terminal vertex than all those found before. The variation of Dijkstra's algorithm employed above does not build a tree, maintaining a vector of initial links of the shortest paths instead, requires several iterations, and works with link weights of arbitrary structure. We will refer to this inventive variation as the Generalized Dijkstra's algorithm.

Let a pass of procedure feasible_path( ) be an iteration of the outermost while-loop.

Lemma If there exist a path $\pi(s,v)$ from source s to some vertex v∈V which can be represented in the form of concatenation.

$$\pi(s,v) = (t_r^* t_{r+1}^* \cdots t_{r+n-1}) \quad (7)$$

where $t_i^*$ is a subpath in topology $\mathcal{T}_i$, then after n passes of procedure feasible_path( ), dist[v] is equal to the cost of a path which is optimal among all paths from s to v allowing representation (7), and next_hop[v] points to the initial link of such a path. If no path allowing representation (7) exists, then after n passes dist[v]=∞ whereas next_hop[v] remains undefined.

Observe that the first pass of the procedure is equivalent to running Generalized Dijkstra's algorithm on topology $\mathcal{T}_r$, induced by the visibility set of the source s. Consequently, all optimal paths found by the algorithm belong to $\mathcal{T}_r$. By virtue of using a variation of Dijkstra's algorithm, the resulting value of dist[v] is equal to the cost of the shortest (i.e., optimal) path from in s to v in topology $\mathcal{T}_r$, if in this topology v is accessible from s, and remains infinite otherwise. In the same time, the resulting value of next_hop[v] points to the initial edge of such path, if one exists, otherwise remaining undefined. This establishes the basis of induction.

Let $dist^{(n)}[v]$ and $next\_hop^{(n)}[v]$ be the local vector entries, corresponding to node v, after n passes of procedure feasible_path( ). Extend set E by fake edges $f_v$ from the source s to each vertex v∈V, whose weights are defined as $w(f_v) = dist^{(n)}[v]$. By assumption, $w(f_v)$ is finite if and only if there exist a path $\pi(s,v)$ from s to v representable in the form (7) and, furthermore, in that case $w(f_v)$ is equal to the cost of an optimal one among such paths. Consider an augmented graph $$G_{n+1} = (V, T_{r+n} \cup \{f_v = (s,v)\}) \quad (8)$$

By construction of procedure feasible_path( ) and definition (5), the (n+1)-th pass of the procedure is equivalent to running Generalized Dijkstra's algorithm on the augmented graph (8) initializing it to the state when all fake edges emanating from the source vertex, and only those edges, have already been labeled. If for some vertex v, the original graph G=(V,E) contains a path $\pi(s,v)$ from s to v of the form $$\pi(s,v) = (t_r^* t_{r+1} \cdots t_{r+n-1}^*) \quad (9)$$

with u being the terminal vertex of subpath $$\pi(s,v) = (t_r^* t_{r+1}^* t_{r+n-1})$$

then the edge set of the augmented graph (8) contains a fake edge $f_u = (s,u)$, such that $w(f_u) \neq \infty$. By definition, it also contains all edges $T_{r+n}$. Then, by virtue of running a variation of Dijkstra's algorithm on the augmented graph, dist$^{(n+1)}$[v] is finite and equal to the cost of an optimal path among those which can be represented as a concatenation of some fake edge $f_u$ and a subpath belonging to topology $\mathcal{T}_{r+n}$. Recall that each fake edge in fact corresponds to an optimal path of the form (7). Therefore, dist$^{(n-1)}$[v] is equal to the cost of an optimal path of the form (9). The value of next_hop$^{(n+1)}$[v] in this case either coincides with next_hop$^{(n)}$[u], if s≠u, or points to the initial edge of an optimal path $(\phi_r \cdots \phi_{r+n-1} t_{r+n}^*)$, otherwise.

Finally, since all paths considered by Generalized Dijkstra's algorithm running on the augmented graph are concatenations of some fake edge $f_u$ and a subpath in topology $\mathcal{T}_{r+n}$, the finite value of dist$^{(n+1)}$[v] would imply existence of a path represented as (9). If no such path exists, the resulting value of $dist^{(n+1)}[v]$ is necessarily infinite with corresponding $next\_hop^{(n+1)}[v]$ undefined. This concludes the proof of the Lemma.

Combining the statement of this Lemma with the necessary and sufficient condition of Theorem 3 proves the following Theorem 4 (Correctness) When procedure feasible_path( ) executing at node s terminates, dist[v] is equal to the cost of an optimal feasible path from s to v and next_hop[v] points to the initial link of such a path. If no feasible path exists, then upon termination, $dist[v]=\infty$ whereas next_hop[v] remains undefined.

III APPLICATIONS

After completing the discussion of the theoretical background and the algorithmic part, we now focus on the practical applications of the proposed routing method. The examples given below should simplify the understanding of the theoretical discourse and demonstrate how the theory can be applied to the deployment and operation of routing protocols.

A. Mapping to Existing Networks

The directed graph model is a traditional abstraction of a communication network. As in most link-state routing protocols, it operates with a notion of an abstract node, attached to other nodes by virtual links. Each bidirectional communication link, as commonly and expectedly encountered in today's networks, is mapped onto a pair of unidirectional edges of the graph with possibly different weights w(e) corresponding to link-state parameters in the respective directions. Although presently the non-negative integer weights are predominant, the advent of QoS routing schemes strongly motivates the protocol generalizations which are capable to operate with link-state parameters of the more complex structure. With this aspect in mind, it is easy to see the equivalence of the shortest path and the optimal path concepts. Traditionally, the shortest paths are computed using a centralized, distributed or replicated version of appropriate algorithms with an underlying topology distribution mechanism, a functional conglomerate known as "routing protocol."

The novelty of the proposed approach manifests itself in the fact that we do not assume that the routing protocols are running, "invisible" to each other, on disjoint parts of the network's topology. Neither do we imply that such separation is taking place by abstracting paths computed by an "underlying" routing protocol as virtual topology. Instead, we allow the protocols to overlap or contain each other's topologies. We assume such information to be "hierarchically" visible within multiple protocols or, expressed differently, that the protocols are "integrated." This concept is formalized with a notion of a visibility set: each node v is able to see only a subset $F_v$ of the communication link set E. Disregarding aggregation issues, a traditional routing protocol assumes that all nodes in the protocol's routing domain share the same visibility set. We show that this is not necessary and hop-by-hop forwarding can be utilized within protocols which abandon this assumption. We do not consider the problem of assuring the specified routing policies (RP1 and RP2) in general, but concentrate on the more practical case of embedded visibility sets. The partition of V into disjoint subsets, $V_1, \ldots, V_n$, can be viewed as partitioning of the network into multiple routing domains, each running a different routing protocol or a different version of the same protocol with its own visibility set. The visibility sets of these domains do not have to be disjoint. On the contrary, it is assumed that they may overlap or be included within each other. The concept of topology $\mathcal{T}_i$, as introduced here, defines what can be naturally characterized as a trusted subset of a visibility set, i.e., the topology is built only on those links of the visibility set which are advertised by the nodes having the same or larger view of the network. In other words, while planning a route within the same topology, the source can expect that its original decision won't be changed unless the node, which changes it, has more information about the network than the source itself.

B. Example of Two Topologies

Assume that every unidirectional communication link in a network is assigned a weight $w(e) \in W$, and a restricted link weight space $W' \subset W$ is defined. The set E of all links can be partitioned into two disjoint subsets E' and E" based on the fact whether or not the value of the corresponding link state parameter belongs to the restricted space W'. Assume further that nodes of two types, referred to as "blue" and "red," are present in the network imposing a partition of the vertex set V into two disjoint subsets $V_B$ and $V_R$. The blue nodes observe only those links whose link weights belong to a restricted set W' and ignore all others (i.e., view them as if their weight was infinite). The red nodes observe all the links in the network with their actual weight.

We introduce two topologies, blue topology $\mathcal{T}_B$ and red topology $\mathcal{T}_R$, by defining their corresponding base sets $T_B$ and $T_R$ as follows:

$$T_B = \{e \in E | w(e) \in W'\}$$

$$T_R = \{e \in E | e = (u, v), u \in V_R\}$$

Note that an edge emanating from a red vertex and thus belonging to the red topology at the same time may or may not belong to the blue topology depending on whether or not its weight comes from a restricted space W'.

If the method proposed herein is used, then every blue node naturally searches for the best route to a requested destination among the paths which contain only links with the weights in the restricted set W'. On the other hand, every red node considers as possible candidates all paths which can be represented as a concatenation of two subpaths: red and blue.

C. Transparent Routing Protocol Upgrade

Modern routing protocols such as IS-IS, PNNI and BGP are designed in a way that allows newer protocol versions to transparently pass information through older nodes. The particular mechanism employed is the convention that information elements are encoded as TLV (type, length, value)-triplets and all nodes are obliged to pass such elements even with a type unknown to them to their neighbors possibly taking into account the semantics of some globally known flags per TLV as well. A similar mechanism exists in distance- or path-vector protocols such as BGP. These mechanisms allow for upgrades with newer protocol releases without having to force all devices to execute the same version at a given point in time. However, when new metrics or link properties are introduced during a protocol upgrade, they may only translate partially into the old metrics. A method has not been known to operate two such versions of a protocol in an arbitrary, mixed topology and assure loop-free hop-by-hop forwarding in presence of new and old metrics. The described method allows to run both versions and utilize either metric to forward traffic if they are comparable. This holds under the assumption that the visibility set of the newer protocol version embeds the visibility set of the older one, which is natural if backward compatibility is maintained. Additionally, the newer version has to generate both, new and old information elements for the links on which the metric is still within the old range to assure that the old protocol includes new links within its visibility set as long as possible. Even when a link has purely "new" properties that are not visible to the old nodes, they are still obliged to pass the information, therefore allowing two partitions of the network executing the new protocol version to coordinate their visibility sets.

D. Overlaying Multiple Routing Protocols

Today, routing devices within a data communication network rely mostly on a specific interface running a single routing protocol exclusively and to allow for global reachability by exchanging routes across protocols. The present routing method described herein allows to run multiple routing protocols on the same interface as long as their metrics are comparable and forward along the path with a better cost. This makes a magnitude of novel approaches towards network design possible. It is achievable to design a network running two routing protocols overlaid on top of each other, thus taking advantage of their different properties, e.g., one protocol can provide a fast convergence whether the other protocol can compute slowly optimal paths over the same topology. Such a design could increase robustness of the network, since it helps to avoid possible instability conditions and implementation problems within a single protocol, at an expense of additional bandwidth consumption. A precondition is of course that those protocols do not export routing information into each other and the necessary embedding of visibility sets is guaranteed.

IV CONCLUSIONS

Based on the observation that dynamic routing protocols traditionally restrict possible topological configurations during the deployment of newer versions and their operation in case of intersecting or overlaid domains is not well understood, we introduce a general methodology that formalizes the necessary conditions that have to be met to assure loop-freeness in such scenarios. Additionally, we present a novel algorithm that allows correct hop-by-hop forwarding within a network containing arbitrary mix of nodes running different protocol versions. The same algorithm introduces the possibility to overlap different routing domain as well, still assuring loop-free operation.

We expect the algorithm to prove useful in deployment of new versions of link-state routing protocols, which are still undergoing rapid changes. Missing capabilities, such as QoS support and ongoing development that necessitates new protocol versions can make use of the algorithm presented. Finally, a largely unexplored area is the possibility to run multiple routing protocols in an overlaid fashion to increase network stability or use different convergence algorithms and convergence properties to open new network design choices.

Many more variations of the preferred embodiment of the invention are possible without departing from the spirit, the essential criteria and the rules and methods of this invention. The proper scope of this invention is indicated by the appended claims, rather than by the foregoing description and all variations which come within the meaning and range of equivalency of the claims are therefore intended to be covered by the claims stated hereinafter.

APPENDIX

```
(1)    procedure feasible_path (r,k,{ V_i, i = 1 ... k }
                    { F_i, i = r ... k },{ w(e),e ∈ F_r },s)
(2)    var
(3)        dist [1:N] is vector of abstract cost;
(4)        next_hop [1:N] is vector of edges;
(5)        candidates is set of vertices;
(6)        next_candidates is set of vertices;
(7)    begin
(8)        for all v ∈ U_i V_i
(9)            dist [v] := ∞;
(10)       end for
(11)       dist [s] := 0;
(12)       candidates := {s};
(13)       i := r;
(14)       while i ≤ k do
(15)           next_candidates := {};
(16)           while candidates ≠ {} do
(17)               v := remove (candidates);
(18)               Ω: = { e ∈ F_i | Γ(e) = v and Class(v) ≤ i};
(19)               for all e ∈ Ω
(20)                   if dist[v] ⊕ w(e) ≤ dist[Δ(e)] then
(21)                       dist[ Δ(e)] := dist[v] ⊕ w(e);
(22)                       if v = s then next_hop[Δ(e)] := e;
(23)                       else next_hop[Δ(e)] := next_hop[v];
(24)                       endif
(25)                   endif
(26)                   if Δ(e) ∉ candidates then
(27)                       insert (candidates, Δ(e));
(28)                   else
(29)                       update (candidates, Δ(e));
(30)                   endif
(31)               end for
(32)               insert (next_candidates,v);
(33)           end while
(2)            candidates := next_candidates;
(3)            i := i + 1;
(4)        end while
(5)    end feasible_path
```

We claim:

1. In a communication network modeled by a directed graph G=(V,E) where the vertices in set V represent routing nodes and the edges in E correspond to communication links, the set of edges E being a union of K ordered edge subsets $E_1, E_2, \ldots, E_K$, a method for searching for a set of paths from a source node to any destination node which can be represented as a concatenation of K possibly empty subpaths $T_1, T_2, \ldots, T_K$, with each subpath $T_i$ that is not empty being composed entirely of the edges in subset $E_i$, said method comprising the steps of:

(a) selecting the first subset of edges $E_1$ in the ordered sequence of edge subsets $E_1, E_2, \ldots, E_K$;

(b) determining the shortest paths from the source node to all other nodes on a partial graph consisting of the set of vertices V and the edges in the selected subset of edges $E_1$;

(c) for any node reachable from the source node along any of the determined shortest paths, storing the determined shortest path;

(d) for any node reachable from the source node along any one of the determined shortest paths, creating a set of fake edges from the source node to the reachable node, and assigning a weight to each fake edge equal to the length of the corresponding shortest path;

(e) selecting a next subset of edges $E_i$ in the ordered sequence of edge subsets $E_1, E_2, \ldots, E_K$, and determining the shortest paths from the source node to all other nodes on a partial graph consisting of the set of vertices V and the union of the edges in the selected subset of edges $E_i$ and the previous set of fake edges;

(f) repeating steps (c)–(e) until all subsets of edges in the ordered sequence of the edge subsets are considered; and (h) selecting as a target set of paths to a desired destination node the set of the shortest paths determined in the last iteration of step (c) for the desired destination, if the set of shortest path is defined.

2. The method of claim 1 further comprising the step of forwarding a packet from the source node to the destination node along the selected target of paths.

3. The method of claim 1 further comprising the step of establishing a connection between the source node and the destination node.

4. The method of claim 1 further comprising the step of repeating steps (a)–(h) for all nodes designated as source nodes.

5. The method of claim 1 further comprising the step of repeating steps (a)–(h) for each desired destination node in the communication network.

6. The method of claim 1 further comprising the step of storing the next hop or first intermediate node along the chosen target set of paths.

7. The method of claim 1 further comprising the step of classifying network nodes into a multilevel hierarchy such that every link visible to a node belonging to a lower level of the multilevel hierarchy is necessarily visible to each node belonging to each higher level of the multilevel hierarchy.

8. The method of claim 1 wherein a path is visible from a predetermined node if the weights of all the links in the path as perceived by that predetermined node are finite.

9. The method of claim 8 wherein the weights of the links in a path is the same for all nodes for which the path is visible.

10. The method of claim 1 wherein network nodes run different routing protocols.

11. The method of claim 1 wherein network nodes run different versions of the same routing protocol.

12. The method of claim 1 wherein the communication network supports Quality of Service (QoS) parameters of arbitrary complexity.

13. The method of claim 1 wherein the absolute cost of a desired path between two nodes is a mathematical function of the weights of the links contained in the desired path.

14. The method of claim 13 wherein the mathematical function is a summation.

15. The method of claim 13 wherein the mathematical function is a minimum.

16. In a communication network modeled by a directed graph G=(V,E) where the vertices in set V represent routing nodes and the edges in E correspond to communication links, the vertex set V partitioned into K disjoint subsets $V_1, V_2, \ldots, V_K$ and each of subsets $V_i$ (i=1 . . . K) associated with a visibility set $F_i \subseteq E$ such that all nodes in $V_i$ share the same view of the network topology and have a hierarchical level defined as $E=F_1 \supset F_2 \supset \ldots F_{K-1} \supset F_K$, a method for determining the first hop of a route from a source node to any destination node in the network, said method comprising the steps of:

(a) selecting a subset of edges in a visibility set $F_1$ such that visibility set $F_1$ is visible from the node associated with the initial vertex of each selected edge;

(b) determining the shortest paths from the source node to all other nodes on a partial graph consisting of the set of vertices V and the selected subset of edges in visibility set $F_1$;

(c) for any node reachable from the source node along any one the determined shortest paths, storing the length and initial hop of the shortest path from the source node to the reachable node;

(d) for any node reachable from the source node along any one of the determined shortest paths, creating a first set of fake edges from the source node to the reachable node, and assigning a weight to each fake edge equal to the length of the corresponding shortest path;

(e) selecting a subset of edges in the visibility set $F_i$ of the next hierarchical level such that visibility set $F_i$ is visible from the node associated with the initial vertex of each selected edge;

(f) determining the shortest paths from the source node to all other nodes on a partial graph consisting of the set of vertices V and the union of the selected subset of edges of step (e) and the previous set of fake edges;

(g) repeating steps (c)–(f) until the visibility sets of all hierarchy levels have been considered; and (h) selecting as the first hop, of the route from the source node to a desired destination node, the initial hop of the shortest path determined in the last iteration of step (c) for the desired destination node, if the initial hop is defined.

17. The method of claim 16 further comprising the step of establishing routing policies to route a packet from the source node to the desired destination node.

18. The method of claim 17 wherein the step of establishing routing policies includes dropping a packet if the first hop is undefined.

19. The method of claim 17 wherein the step of establishing routing policies includes forwarding a packet to a neighboring node belonging to a vertex subset associated with a visibility set of a higher hierarchical level.

20. The method of claim 16 further comprising the step of forwarding a packet from the source node to the desired destination node along the chosen shortest path.

21. The method of claim 16 further comprising the step of establishing a connection between the source node and the desired destination node.

22. The method of claim 16 further comprising the step of repeating steps (a)–(h) for all nodes designated as source nodes.

23. The method of claim 16 further comprising the step of repeating steps (a)–(h) for each desired destination node in the communication network.

24. The method of claim 16 further comprising the step of storing the next hop or first intermediate node along the selected shortest path.

25. The method of claim 16 wherein a path is visible from a predetermined node if the weights of all the links in the path as perceived by that predetermined node are finite.

26. The method claim 16 wherein the weights of the links in a path is the same for all nodes for which the path is visible.

27. The method of claim 16 wherein network nodes run different routing protocols.

28. The method of claim 16 wherein network nodes run different versions of the same routing protocol.

29. The method of claim 16 wherein the communication network supports Quality of Service (QoS) parameters of arbitrary complexity.

30. The method of claim 16 wherein the absolute cost of a desired path between two nodes is a mathematical function of the weights of the links contained in the desired path.

31. The method of claim 30 wherein the mathematical function is a summation.

32. The method of claims 30 wherein the mathematical function is a minimum.

* * * * *